US011601491B2

(12) United States Patent
Sodagar

(10) Patent No.: US 11,601,491 B2
(45) Date of Patent: Mar. 7, 2023

(54) NETWORK-BASED MEDIA PROCESSING (NBMP) WORKFLOW MANAGEMENT DIRECT ACCESS IN 5G FRAMEWORK FOR LIVE UPLINK STREAMING (FLUS)

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/087,992

(22) Filed: Nov. 3, 2020

(65) Prior Publication Data
US 2021/0306402 A1 Sep. 30, 2021

Related U.S. Application Data

(60) Provisional application No. 63/001,989, filed on Mar. 30, 2020.

(51) Int. Cl.
*H04L 65/80* (2022.01)
*H04L 67/02* (2022.01)
*H04L 41/50* (2022.01)

(52) U.S. Cl.
CPC .............. *H04L 65/80* (2013.01); *H04L 41/50* (2013.01); *H04L 67/02* (2013.01)

(58) Field of Classification Search
CPC ....... H04L 65/601; H04L 65/80; H04L 41/50; H04L 67/02
See application file for complete search history.

(56) References Cited

U.S. PATENT DOCUMENTS

| 2004/0128512 | A1* | 7/2004 | Sharma | G06Q 20/3823 713/176 |
| 2015/0146718 | A1* | 5/2015 | Wang | H04L 45/70 370/389 |
| 2019/0166031 | A1* | 5/2019 | Francis | H04L 67/28 |
| 2020/0304508 | A1* | 9/2020 | Bae | H04L 63/102 |

OTHER PUBLICATIONS

"3GPP TS 26.238," Mar. 2020. (Year: 2020).*
3GPP TS 26.238 V16.4.2, "3rd Generation Partnership Project; Technical Specification Group Services and System Aspects; Uplink Streaming (Release 16)", Mar. 2020, pp. 1-47.

* cited by examiner

*Primary Examiner* — Andrew C Georgandellis
(74) *Attorney, Agent, or Firm* — Sughrue Mion, PLLC

(57) ABSTRACT

Systems and methods for media processing and streaming are provided. A method is performed by a Network-Based Media Processing (NBMP) source of a Framework for Live Uplink Streaming (FLUS) system. The method includes obtaining descriptions of capabilities of a FLUS sink via a FLUS source; and sending, to an NBMP workflow manager of the FLUS system via a path that does not include the FLUS source and the FLUS sink, a request to create or modify a workflow of the FLUS system based on the descriptions of the capabilities obtained.

16 Claims, 6 Drawing Sheets

NETWORK-BASED MEDIA PROCESSING (NBMP) WORKFLOW MANAGEMENT DIRECT ACCESS IN 5G FRAMEWORK FOR LIVE UPLINK STREAMING (FLUS)

CROSS-REFERENCE TO RELATED APPLICATION

This application claims priority from U.S. Provisional Application No. 63/001,989, filed on Mar. 30, 2020, the disclosure of which is incorporated herein by reference in its entirety.

FIELD

Embodiments of this disclosure are directed to media processing and streaming methods and systems, more particularly to Moving Picture Experts Group (MPEG) Network-Based Media Processing (NBMP) and Framework for Live Uplink Streaming (FLUS) methods and systems.

BACKGROUND

Moving Picture Experts Group (MPEG) Network-Based Media Processing (NBMP) project has developed a concept of processing media on the cloud. "Text of ISO/IEC DIS 23090-8 Network-based Media Processing", ISO/IEC JTC 1/SC 29/WG 11 (N 18657), dated Jul. 12, 2019, is incorporated herein in its entirety.

3rd Generation Partnership Project (3GPP) Framework for Live Uplink Streaming (FLUS) protocol provides a mechanism for uplink streaming of multimedia content from a source device to a network and sending/distributing that content to one or more destinations. "3rd Generation Partnership Project; Technical Specification Group Services and System Aspects; Uplink Streaming (Release 16)", 3GPP TS 26.238 V16.2.0, dated September 2019, is incorporated herein in its entirety.

SUMMARY

In the NBMP standard, an NBMP source is the entity providing workflow description to a workflow manager to create, run, manage, and monitor a media workflow. The interaction between the NBMP source and the workflow manager is through a set of NBMP Operation Application Programming Interfaces (APIs).

In the case of the 3GPP FLUS protocol, the source device of media streams establishes an uplink session with a sink through the network. The FLUS APIs allows the source device to control the session and also the sink to provide feedback or remote control of the source device.

The current 3GPP FLUS protocol supports including NBMP Workflow Description Document (WDD) as part of a session control update by the source device. However, the full interaction of the NBMP source and the workflow manager may not be possible with limited carriage of NBMP WDD in the 3GPP FLUS session resource.

Embodiments of the present disclosure may address the above problems and/or other problems.

Embodiments of the present disclosure may provide a mechanism for an NBMP source to fully control an NBMP workflow manager directly after the NBMP source obtains a Uniform Resource Locator (URL) of the NBMP workflow manager.

Embodiments of the present disclosure may define a mechanism to use cloud-based workflow processing for an uplink streaming, wherein control is provided by a client device which may be the source of the uplink. Embodiments of the present disclosure may provide an architecture in which a source client is an NBMP source to manage a workflow through a FLUS control interface.

According to embodiments, a method performed by a Network-Based Media Processing (NBMP) source of a Framework for Live Uplink Streaming (FLUS) system is provided. The NBMP source includes at least one processor. The method includes: obtaining descriptions of capabilities of a FLUS sink via a FLUS source; and sending, to an NBMP workflow manager of the FLUS system via a path that does not include the FLUS source and the FLUS sink, a request to create or modify a workflow of the FLUS system based on the descriptions of the capabilities obtained.

According to an embodiment, the obtaining includes obtaining, via the FLUS source, a description document that includes the descriptions of the capabilities.

According to an embodiment, the obtaining includes: obtaining, via the FLUS source, an address at which a description document that includes the descriptions of the capabilities is located; and obtaining the description document by using the address that is obtained.

According to an embodiment, the address is a Uniform Resource Locator (URL).

According to an embodiment, the method further includes sending, to the FLUS source, a request to obtain the descriptions of the capabilities of the FLUS sink.

According to an embodiment, the method further includes obtaining a list of FLUS sinks from a FLUS server via the FLUS source, wherein the request to obtain the descriptions of the capabilities of the FLUS sink is sent based on the FLUS sink being included in the list of FLUS sinks.

According to an embodiment, the method further includes obtaining, via the FLUS source, an identifier that indicates that the NBMP workflow manager supports network based media processing.

According to an embodiment, the method further includes obtaining, via the FLUS source, an address of the NBMP workflow manager, wherein the request to create or modify the workflow of the FLUS system is sent to the NBMP workflow manager by using the address that is obtained.

According to an embodiment, the address is a Uniform Resource Locator (URL).

According to an embodiment, the method further includes sending, via the FLUS source, a request to obtain the descriptions of the capabilities of the FLUS sink, wherein the address of the NBMP workflow manager and the descriptions of the capabilities of the FLUS sink are obtained based on sending the request to obtain the descriptions.

According to one or more embodiments, a system is provided. The system includes: at least one memory configured to store computer program code; and at least one processor configured to access the computer program code and operate as instructed by the computer program code. The computer program code includes: workflow request code configured to cause a Network-Based Media Processing (NBMP) source, implemented by the at least one processor, of a Framework for Live Uplink Streaming (FLUS) system to send, to an NBMP workflow manager of the FLUS system via a path that does not include a FLUS source and a FLUS sink of the FLUS system, a request to create or modify a workflow of the FLUS system, wherein the request is based on descriptions of capabilities of the FLUS sink obtained by the NBMP source via the FLUS source.

According to an embodiment, the NBMP source is configured to receive, via the FLUS source, a description document that includes the descriptions of the capabilities, and the computer program code further includes obtaining code configured to cause the NBMP source to obtain the descriptions of the capabilities from the description document.

According to an embodiment, the at least one processor is configured to receive, via the FLUS source, an address at which a description document that includes the descriptions of the capabilities is located; and the computer program code further includes obtaining code configured to cause the NBMP source to obtain the description document by using the address that is obtained.

According to an embodiment, the address is a Uniform Resource Locator (URL).

According to an embodiment, the computer program code further includes capabilities request code configured to cause the NBMP source to send, to the FLUS source, a request to obtain the descriptions of the capabilities of the FLUS sink.

According to an embodiment, the at least one processor is configured to obtain a list of FLUS sinks from a FLUS server via the FLUS source, wherein the capabilities request code is configured to cause the NBMP source to send the request to obtain the descriptions of the capabilities of the FLUS sink based on the FLUS sink being included in the list of FLUS sinks.

According to an embodiment, the at least one processor is configured to obtain, via the FLUS source, an address of the NBMP workflow manager, and the workflow request code is further configured to cause the NBMP source to send the request to create or modify the workflow of the FLUS system by using the address that is obtained.

According to an embodiment, the address is a Uniform Resource Locator (URL).

According to an embodiment, the computer program code further includes capabilities request code configured to cause the NBMP source to send, to the FLUS source, a request to obtain the descriptions of the capabilities of the FLUS sink, and the address of the NBMP workflow manager and the descriptions of the capabilities of the FLUS sink are obtained by the NBMP source based on the request to obtain the descriptions.

According to one or more embodiments, a non-transitory computer-readable medium storing computer code is provided. The computer code is configured to, when executed by at least one processor, cause the at least one processor to implement a Network-Based Media Processing (NBMP) source, of a Framework for Live Uplink Streaming (FLUS) system, that: obtains descriptions of capabilities of a FLUS sink from a FLUS source, and sends to an NBMP workflow manager of the FLUS system via a path that does not include the FLUS source and the FLUS sink, a request to create or modify a workflow of the FLUS system based on the descriptions of the capabilities obtained.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
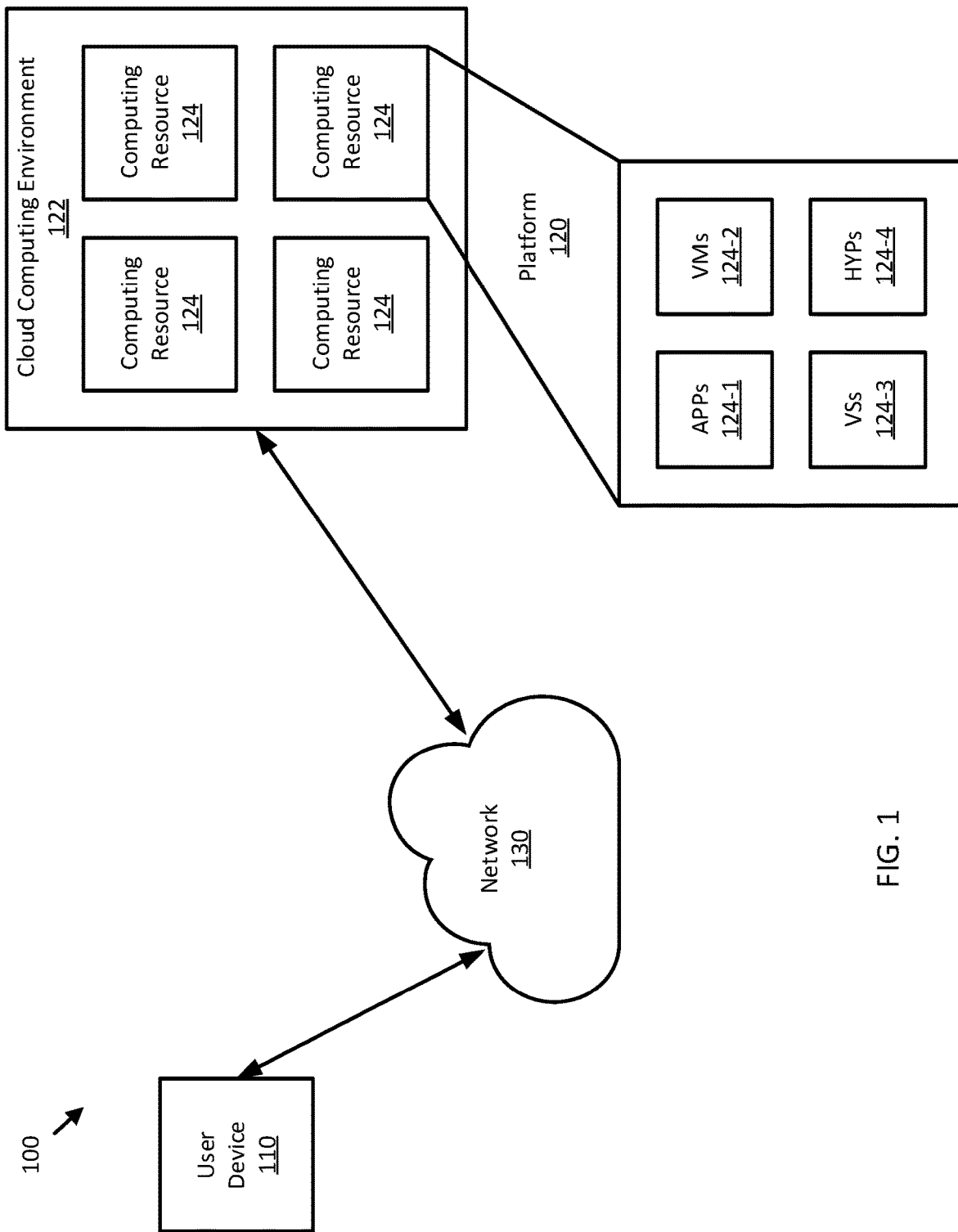
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
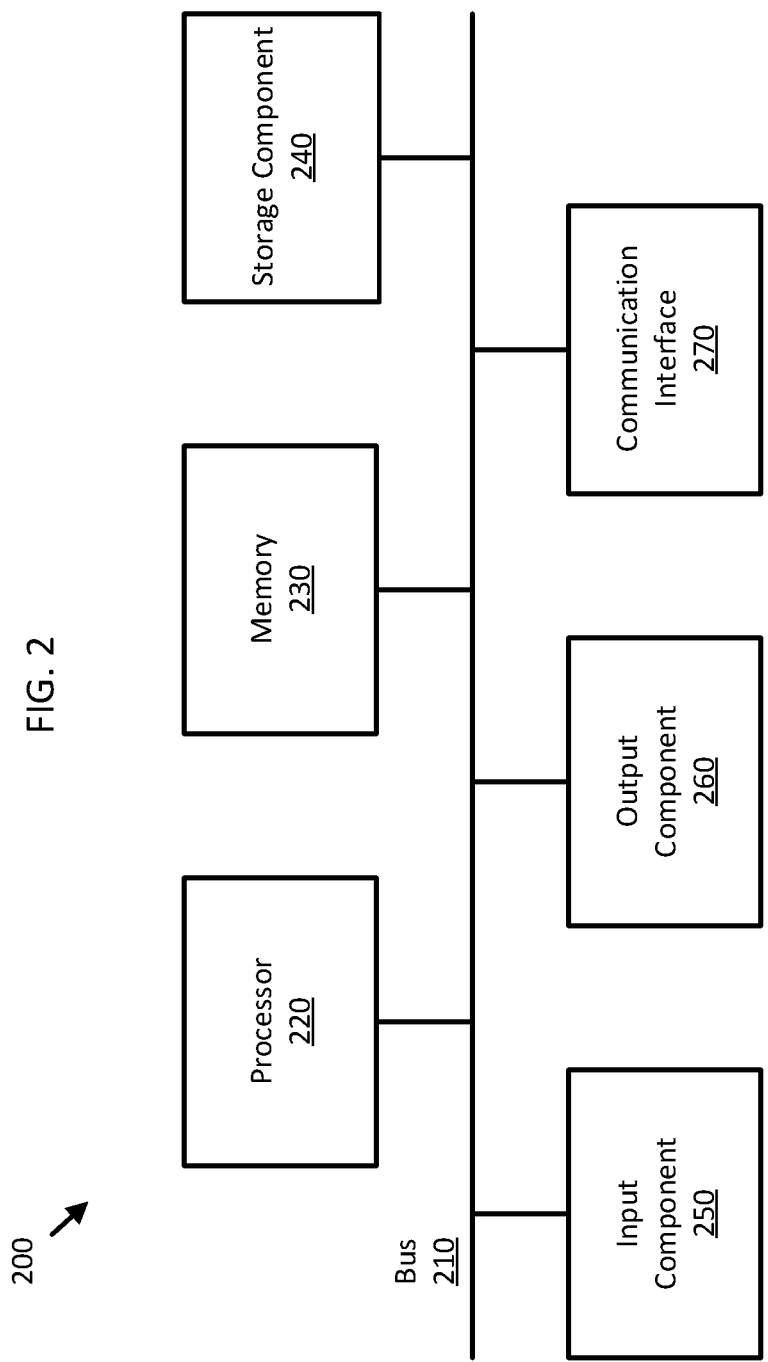
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
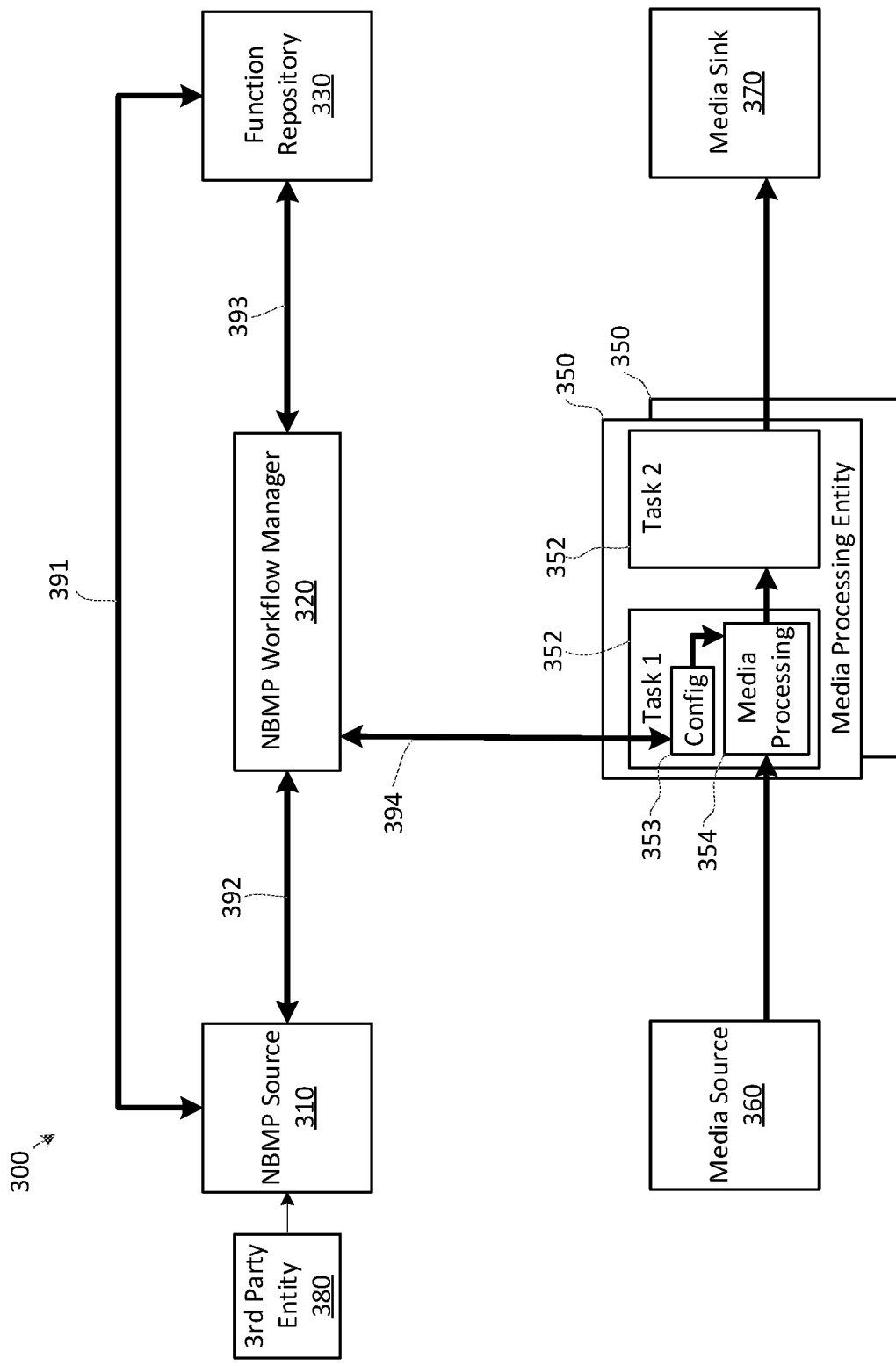
FIG. 3 is a block diagram of an NBMP system, according to embodiments.

In an embodiment of the present disclosure, an NBMP system 300 is provided. With reference to FIG. 3, the NBMP system 300 comprises an NBMP source 310, an NBMP workflow manager 320, a function repository 330, one or more media processing entities 350, a media source 360, and a media sink 370.

The NBMP source 310 may receive instructions from a third party entity 380, may communicate with the NBMP workflow manager 320 via an NBMP workflow API 392, and may communicate with the function repository 330 via a function discovery API 391. For example, the NBMP source 310 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may comprise or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an NBMP task API 394. The NBMP workflow manager 320 may comprise or be implemented by at least one processor and memory that stores code configured to cause the at least processor to perform the functions of the NBMP workflow manager 320.

The NBMP workflow manager 320 may use the NBMP task API 394 to setup, configure, manage, and monitor one or more tasks 352 of a workflow that is performable by the one or more media processing entities 350. In an embodiment, the NBMP workflow manager 320 may use the NBMP task API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the NBMP task API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 352, created by the NBMP workflow manager 320, and output the processed media content to the media sink 370. The one or more media processing entities 350 may each comprise or be implemented by at least one processor and memory that stores code configured to cause the at least processor to perform the functions of the media processing entities 350.

The media source 360 may include memory that stores media and may be integrated with or separate from the NBMP source 310. In an embodiment, the NBMP workflow manager 320 may notify the NBMP source 310 when a workflow is prepared and the media source 360 may transmit media content to the one or more of the media processing entities 350 based on the notification that the workflow is prepared.

The media sink 370 may comprise or be implemented by at least one processor and at least one display that is configured to display the media that is processed by the one or more media processing entities 350.

The third party entity 380 may comprise or be implemented by at least one processor and memory that stores code configured to cause the at least processor to perform the functions of the third party entity 380.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In cases, communication between any of the components of the NBMP system 300 using an API may include several descriptors, each of which may have several parameters.

Figure 4:
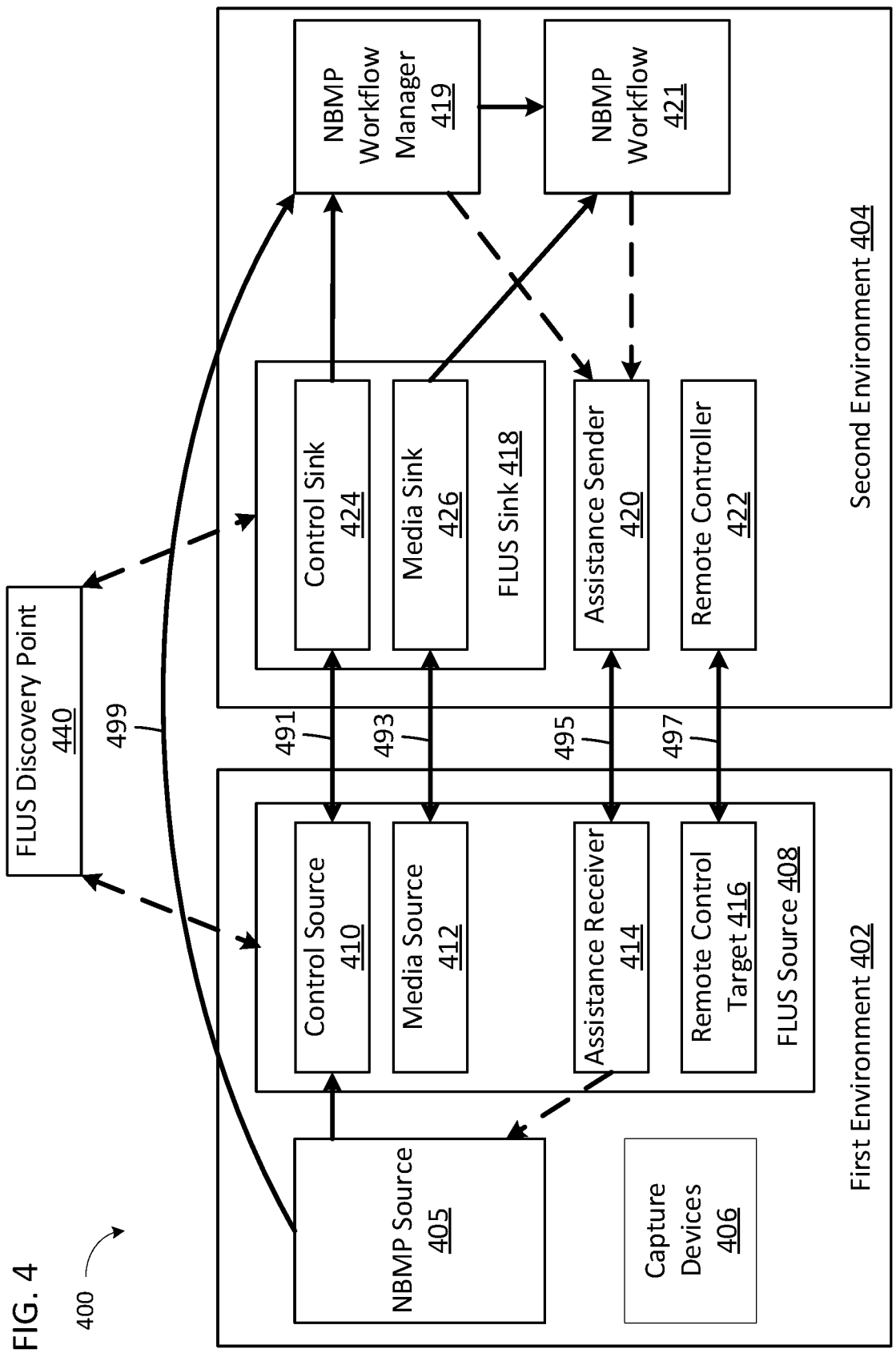
FIG. 4 is a block diagram of a 3GPP FLUS architecture, according to embodiments.

Referring now to FIG. 4, a block diagram of a 3GPP FLUS architecture 400 of an embodiment of the present disclosure is depicted. The 3GPP FLUS architecture 400 may comprise a first environment 402 (e.g. a user environment that comprises or consists of one or more user devices) and a second environment 404 (e.g a user environment or a network). The first environment 402 may comprise an NBMP source 405 (which may correspond to NBMP source 310), one or more capture devices 406, and a FLUS source 408. The FLUS source 408 may comprise a control source 410, a media source 412, an assistance receiver 414, and a remote control target 416. The second environment 404 may comprise a FLUS sink 418, an NBMP workflow manager 419 (which may correspond to NBMP workflow manager 320), an assistance sender 420, an NBMP workflow 421 (which may include, for example, tasks 352 that may be performable by at least one processor, with memory, in the second environment 4040 or another environment), and a remote controller 422. The FLUS sink 418 may comprise a control sink 424 and a media sink 426.

Any number of the NBMP source 405, capture devices 406, control source 410, media source 412, assistance receiver 414, and remote control target 416 may be implemented by a same or different at least one processor and memory, storing computer instructions, of the first environment 402. Also, any number of the control sink 424, media sink 426, assistance sender 420, remote controller 422, and NBMP workflow manager 419 may be implemented by a same or different at least one processor and memory, storing computer instructions, of the second environment 404.

Communication between the first environment 402 and the second environment 404 may be provided by, for example, a network. For example, the communication may be provided via a link 491 (e.g. an F-C link), a link 493 (e.g. an F-U link), a link 495 (e.g. an F-A link), a link 497 (e.g. an F-RC) link, and a path 499 (e.g. a direct NBMP API). The link 491 may represent end points of a communication route between the control source 410 and the control sink 424. The link 493 may represent end points of a communication route between the media source 412 and the media sink 426. The link 495 may represent end points of a communication route between the assistance receiver 414 and the assistance sender 420. The link 497 may represent end points of a communication route between the remote control target 416 and the remote controller 422. The path 499 may be a communication route between the NBMP source 405 and the NBMP workflow manager 419 that does not include the FLUS source 408 and the FLUS sink 418.

The FLUS source 408 may receive media content from one or more of the capture devices 406 within the first environment 402, or connected to the first environment, and forward the media content to the FLUS sink 418. The FLUS sink 418 may forward the media content to a decoding and rendering function and/or to a processing or distribution sub-function within the second environment 404.

The control source 410 may control, via link 491, the control sink 424 to process received media content for subsequent downstream distribution, and may select FLUS media instantiation. The link 491 may represent interactions associated with the creation and modification of the configuration of the FLUS sink 418. For example, the link 491 may allow the control source 410 to select a FLUS media instantiation, provide static metadata associated with each media session present in the FLUS session, and select and configure the processing and distribution sub-functions.

The media source 412 and the media sink 426 may, using the link 493, set up one or more media sessions and subsequent media data transmissions via media streams. FLUS media instantiation may be defined as part of a FLUS session. Multiple media streams may be established for one FLUS session. A media stream may contain media components of one or more media content types (e.g. audio and/or video). A FLUS session may be composed of one or more media streams containing, for example, the same content type (e.g. multiple media streams of video).

The assistance sender 420 may send, via the link 495, assistance messages to the assistance receiver 414. The FLUS source 408 may be configured to alter behavior of the FLUS media function (e.g. media sending behavior of the media source) within the FLUS source 408 based on the assistance messages. Assist information within assist messages may pertain to, for example, network related conditions, viewership or engagement information from content recipients, or user preference data. An example recommendation issued by the assistance receiver 414 to the media source 412 may be to only upload the first 5 seconds of video to the FLUS sink 418, due to current absence of viewership of live uplink streaming content.

The remote controller 422 may send, via the link 497, control messages to the remote control target 416. The control messages may include commands such as, for example, to start or stop a media upstreaming process in the FLUS source 408. The FLUS source 408 may be configured to alter behavior of the media source 412 based on the control messages. The remote controller 422 may, via the link 497, provide media sink information to the FLUS source 408, select a FLUS media instantiation, and determine capture device settings and other FLUS source parameters.

According to embodiments, the 3GPP FLUS architecture 400 may include one or more FLUS discovery points 440 that stores a list of FLUS sinks. According to embodiments, the FLUS discovery points 440 may be FLUS servers.

In the 3GPP FLUS specification, a communication mechanism is only defined for a FLUS Session. Also, as part of updating a FLUS sink configuration, a WDD can be submitted. Finally, using a "get FLUS Sink Status", a WDD can be received.

According to embodiments of the present disclosure, the NBMP source 405 and the workflow manager 419 may be provided, which may communicate through the control source 410 and the control sink 424, and also directly with each other. For example, with reference to FIG. 5, the NBMP source 405 may define a workflow processing 500, which may include a direct NBMP workflow creation. The workflow processing 500 may include, for example, a sink discovery stage (stage 1), a capabilities discovery stage (stage 2), and a workflow creation stage (stage 3). Examples of the stages are described below.

Stage 1, Sink Discovery: The NBMP source 405 may first discover the existing (FLUS) sinks by making a request (505) to the FLUS source 408, which the FLUS source 408 may consequently send (510) to FLUS discovery points 440. In response, the FLUS discovery points 440 may send (515) a list of (FLUS) sinks to the FLUS source which consequently may be sent (520) by the FLUS source 408 to the NBMP source 405.

Stage 2, Capabilities Discovery: The NBMP source 405 may send a request (525) to the FLUS source 408 for information on the capabilities of one of the FLUS sinks listed in the sink list. For example, the NBMP source 405 may send the request (525) for information on the capabilities of the FLUS sink 418, in a case where the FLUS sink 418 is listed in the sink list. The FLUS source 408 may pass (530) the request to the FLUS sink 418. In some cases, the FLUS sink 418 may already have the information on the capabilities of its platform. The FLUS sink 418 may provide a request (532) to the NBMP workflow manager 419. In cases where the FLUS sink 418 does not already have the information on its capabilities, the request (532) may include a request for the NBMP workflow manager 419 to get the information on the current capabilities of the FLUS sink 418. It is noted that the capabilities of FLUS sinks may change depending on the current running workflows.

In response to the request (532), the NBMP workflow manager 419 may send a response (534), that includes the information requested in the request (532), to the FLUS sink 418. The response (534) may include, for example, the capabilities description of the FLUS sink 418 or a link (e.g. URL), to the capabilities description, and other information. For example, the other information may include an NBMP scheme identifier (e.g. a URN indicating that the NBMP workflow manager 419 supports NBMP and/or a URL of the NBMP workflow manager 419. The FLUS sink 418 may then send a response (535) to the FLUS source 408, which the FLUS source 408 may send (540) to the NBMP source 405. The information included in the response (535) sent by the FLUS sink 418 to the FLUS source 408 may include all or some of the information included in the response (534) from the NBMP workflow manager 419 to the FLUS sink 418, and/or other information previously obtained by the FLUS sink 418. For example, the response (535) may include the capabilities description of the FLUS sink 418, or a link (e.g. URL) to the capabilities description, in a case where the capabilities description (or the link) is received by the FLUS sink 418 from the NBMP workflow manager 419, or in a case where the capabilities description (or the link) is present in the FLUS sink 418 before Stage 2 begins. According to the above, the FLUS source 408 and the NBMP source 405 may obtain workflow capabilities, including FLUS sink capabilities.

According to embodiments, the response (535), which may be provided (540) to the NBMP source 405 by the FLUS sink 418 via the FLUS source 408, may include one or more of the following:
1. An NBMP scheme identifier: a URN indicating that the Workflow Manager supports NBMP.
2. The NBMP scheme identifier and a URL for the location (e.g. a URI) from which the capabilities of the sink (e.g. a network platform) can be retrieved.
3. A capability description document that describes the capabilities of the sink.
4. A URL of the workflow manager.

Stage 3, Workflow Creation: The NBMP source 405 may read the capabilities description that is obtained during the Stage 2. In a case where the NBMP source 405 receives the link to the capabilities description, the NBMP source 405 may use the link to obtain the capabilities description. The NBMP Source may then request (545) the creation of NBMP Workflow, based on the capabilities, directly through the URL of the NBMP workflow manager 419 that is obtained, which may have been provided to the NBMP source 405 from the NBMP workflow manager 419 via the FLUS sink 418 and the FLUS source 408 during the Stage 2. The NBMP workflow manager 419 may send a response (550) back to the NBMP source 405. For example, with reference to FIG. 4, the NBMP source 405 may directly communicate the request to the NBMP workflow manager 419 via the path 499, and the NBMP workflow manager 419 may send a response back to the NBMP source 405 via the path 499. The NBMP workflow manager 419 may create, run, manage, and/or monitor a workflow based on the request from the NBMP source 405.

Following Stage 3, other stages may be provided. For example, the control source 410 of the FLUS source 408 may create a FLUS sink configuration call and establish a session with the control sink 424 (555). The session may be identified with a FLUS session id (e.g. "session-id=202") in the body of a response (560) from the control sink 424 of the FLUS sink 418 to the control source 410 of the FLUS source 408. Thereafter, an NBMP and FLUS media session 565 may be provided by the 3GPP FLUS architecture 400.

[Extending the FLUS Sink Resource]

According to embodiments, the FLUS sink resource may be extended as follows to carry information. For example, the FLUS sink resource may carry a "processing description" object. This object may be a FLUS sink configuration property and may provide a media processing description document that defines the post processing pipeline that the FLUS sink 418 may apply to received media components. The media processing description that includes pipeline description may also set a distribution target (e.g. storage of the FLUS sink 418) for the media. The object may include the following properties: (a) Multipurpose Internet Mail Extensions (MIME) Type, and (b) URL of a workflow manager. The object may be provided in a request to the FLUS sink 418 (e.g. by the NBMP workflow manager 419 or the FLUS source 408), and may update a configuration of the FLUS sink 418.

Embodiments of the present disclosure may be used separately or combined in any order. Further, each of the embodiments (and methods thereof) may be implemented by processing circuitry (e.g., one or more processors or one or more integrated circuits). For example, one or more processors may execute a computer program that is stored in at least one non-transitory computer-readable medium to implement one or more from among the first environment 402 and the second environment 404 (refer to FIG. 4), or implement any number of the components of the first environment 402 (e.g. NBMP source 405 and/or FLUS source 408) and the second environment (e.g. FLUS sink 418 and/or NBMP workflow manager 419), and any number of the functions performed by the components.

Figure 5:
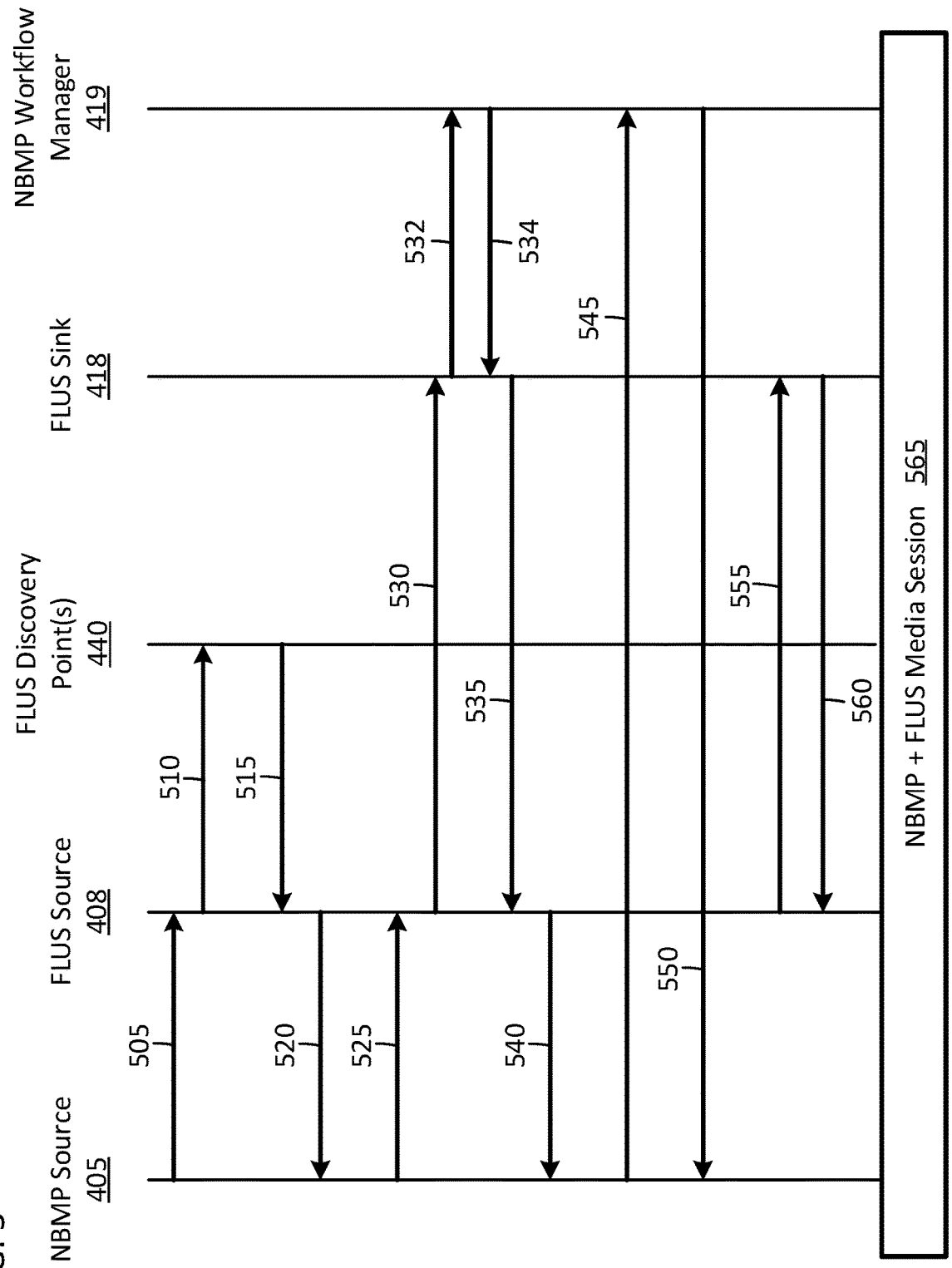
FIG. 5 is a diagram of a workflow processing according to embodiments.
Figure 6:
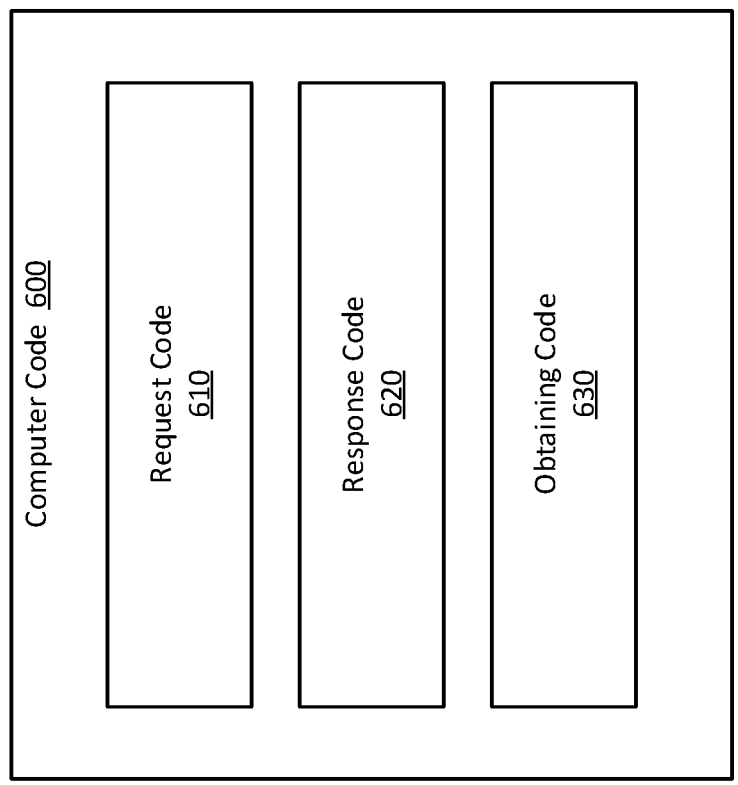
FIG. 6 is a block diagram of computer code according to embodiments.

Referring to FIGS. 5-6, as an example, embodiments of the present disclosure may include computer code 600, such as request code 610, response code 620, and obtaining code 630. Each of the NBMP source 405, the FLUS source 408, the FLUS discovery points 440, the FLUS sink 418, and the NBMP workflow manager 419 may include a portion of such computer code so that they may perform their respective functions based on the computer code provided therewith.

For example, the request code 610 may include request code(s) configured to cause the NBMP source 405 to request a list of sinks, capabilities of a FLUS sink, and creation or modification of a workflow in accordance with embodiments of the present disclosure, and/or the request code 610 may include request code(s) configured to cause the FLUS sink 418 to request information on its capabilities (and/or other information) from the NBMP workflow manager 419 in accordance with embodiments of the present disclosure. The response code 620 may include response code(s) that is configured to cause, for example, the FLUS source 408, the FLUS discovery points 440, the FLUS sink 418, and the NBMP workflow manager 419, to provide (e.g. create or pass on) responses to the requests described with respect to embodiments of the present disclosure. The obtaining code 630 may include obtaining code(s) configured to cause the NBMP source 405 to obtain a capabilities description document based on an address at which the capabilities description document is stored, in accordance with embodiments of the present disclosure.

According to embodiments, a method for establishing NBMP workflow in FLUS includes discovering a plurality of sinks and capabilities of a network platform through a plurality of FLUS discovery and capabilities mechanisms, wherein the capabilities include a URL of a workflow manager, and creating, updating, retrieving and deleting a NBMP workflow through the NBMP workflow manager, wherein a NBMP source requests the creating of the NBMP Workflow directly through the URL.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by a Network-Based Media Processing (NBMP) source of a Framework for Live Uplink Streaming (FLUS) system, the NBMP source including at least one processor, the method comprising:
   sending, to a FLUS source, a first request to obtain descriptions of capabilities of a FLUS sink and an address of an NBMP workflow manager;
   obtaining the descriptions of the capabilities of the FLUS sink and the address of the NBMP workflow manager via the FLUS source in response to the first request, wherein the description of the capabilities of the FLUS sink includes respective processing description object for respective FLUS sink, and wherein the respective processing description object includes a universal resource locator (URL) of the NBMP workflow manager and indicates a post processing pipeline for received media components; and
   sending, to the NBMP workflow manager of the FLUS system via a path that does not include the FLUS source and the FLUS sink, a second request to create or modify a workflow of the FLUS system based on the obtained descriptions of the capabilities.

2. The method of claim 1, wherein
   the obtaining comprises obtaining, via the FLUS source, a description document that includes the descriptions of the capabilities.

3. The method of claim 1, wherein the obtaining comprises:
   obtaining, via the FLUS source, an address at which a description document that includes the descriptions of the capabilities is located; and
   obtaining the description document by using the address that is obtained.

4. The method of claim 3, wherein
   the address is a Uniform Resource Locator (URL).

5. The method of claim 1; further comprising:
   obtaining a list of FLUS sinks from a FLUS server via the FLUS source,
   wherein the first request to obtain the descriptions of the capabilities of the FLUS sink is sent based on the FLUS sink being included in the list of FLUS sinks.

6. The method of claim 1, further comprising:
   obtaining, via the FLUS source, an identifier that indicates that the NBMP workflow manager supports network based media processing.

7. The method of claim 1, wherein the second request to create or modify the workflow of the FLUS system is sent to the NBMP workflow manager by using the address that is obtained.

8. The method of claim 7, wherein the address is a Uniform Resource Locator (URL).

9. A system comprising:
at least one memory configured to store computer program code; and
at least one processor coupled to the memory and configured to access the computer program code and operate as instructed by the computer program code, the computer program code comprising:
sending code configured to cause a Network-Based Media Processing (NBMP) source, implemented by the at least one processor, of a Framework for Live Uplink Streaming (FLUS) system to: send, to a FLUS source, a first request to obtain descriptions of capabilities of a FLUS sink and an address of an NBMP workflow manager,
first obtaining code configured to cause the NBMP source to obtain the descriptions of the capabilities of the FLUS sink and the address of the NBMP workflow manager via the FLUS source in response to the first request, wherein the description of the capabilities of the FLUS sink includes respective processing description object for respective FLUS sink, and wherein the respective processing description object includes a universal resource locator (URL) of the NBMP workflow manager and indicates a post processing pipeline for received media components, and
workflow request code configured to cause the NBMP source to send, to the NBMP workflow manager of the FLUS system via a path that does not include the FLUS source and the FLUS sink of the FLUS system, a second request to create or modify a workflow of the FLUS system,
wherein the second request is based on descriptions of capabilities of the FLUS sink obtained by the NBMP source via the FLUS source.

10. The system of claim 9, wherein
the NBMP source is configured to receive, via the FLUS source, a description document that includes the descriptions of the capabilities, and
the computer program code further comprises second obtaining code configured to cause the NBMP source to obtain the descriptions of the capabilities from the description document.

11. The system of claim 9, wherein
the at least one processor is configured to receive, via the FLUS source, an address at which a description document that includes the descriptions of the capabilities is located; and
the computer program code further comprises third obtaining code configured to cause the NBMP source to obtain the description document by using the address that is obtained.

12. The system of claim 11, wherein
the address is a Uniform Resource Locator (URL).

13. The system of claim 9; wherein
the at least one processor is configured to obtain a list of FLUS sinks from a FLUS server via the FLUS source, wherein the sending code is configured to cause the NBMP source to send the first request to obtain the descriptions of the capabilities of the FLUS sink based on the FLUS sink being included in the list of FLUS sinks.

14. The system of claim 9, wherein
the workflow request code is further configured to cause the NBMP source to send the second request to create or modify the workflow of the FLUS system by using the address that is obtained.

15. The system of claim 14, wherein
the address is a Uniform Resource Locator (URL).

16. A non-transitory computer-readable medium storing computer code that is configured to, when executed by at least one processor, cause the at least one processor to implement a Network-Based Media Processing (NBMP) source, of a Framework for Live Uplink Streaming (FLUS) system, that:
sends, to a FLUS source, a first request to obtain descriptions of capabilities of a FLUS sink and an address of an NBMP workflow manager,
obtains the descriptions of the capabilities of the FLUS sink and the address of the NBMP workflow manager via the FLUS source in response to the first request, wherein the description of the capabilities of the FLUS sink includes respective processing description object for respective FLUS sink, and wherein the respective processing description object includes a universal resource locator (URL) of the NBMP workflow manager and indicates a post processing pipeline for received media components, and
sends to the NBMP workflow manager of the FLUS system via a path that does not include the FLUS source and the FLUS sink, a second request to create or modify a workflow of the FLUS system based on the obtained descriptions of the capabilities.

\* \* \* \* \*